United States Patent [19]
Knee et al.

[11] Patent Number: 5,504,531
[45] Date of Patent: Apr. 2, 1996

[54] METHOD AND APPARATUS FOR FIELD RATE UP-CONVERSION

[75] Inventors: Michael Knee, Strasbourg; Dominique Madeleine, Montreuil sur Lozon, both of France

[73] Assignee: Thomson Consumer Electronics, S.A., Courbevoie, France

[21] Appl. No.: 152,869

[22] Filed: Nov. 16, 1993

[30] Foreign Application Priority Data

Nov. 19, 1992 [EP] European Pat. Off. ............ 92403119

[51] Int. Cl.$^6$ ............................................. H04N 7/01
[52] U.S. Cl. ........................................ 348/452; 348/448
[58] Field of Search .................... 348/452, 451, 348/448, 447, 443, 444, 458, 459, 699, 441, 700, 701, 911; H04N 7/01, 5/91, 5/14

[56] References Cited

U.S. PATENT DOCUMENTS

| | | | |
|---|---|---|---|
| 4,740,842 | 4/1988 | Annegarn et al. | 348/452 |
| 4,845,557 | 7/1989 | Lang | 358/105 |
| 4,868,655 | 9/1989 | Choquet et al. | 348/448 |
| 5,012,337 | 4/1991 | Gillard | 348/452 |
| 5,111,511 | 5/1992 | Ishii et al. | 348/699 |
| 5,138,448 | 8/1992 | Gillies et al. | 348/443 |
| 5,177,610 | 1/1993 | Wilkinson | 348/452 |

FOREIGN PATENT DOCUMENTS

| | | | |
|---|---|---|---|
| 372774 | 6/1990 | European Pat. Off. | H04N 5/44 |
| 415325 | 6/1991 | European Pat. Off. | H04N 5/14 |
| 62-086981 | 9/1987 | Japan | H04N 5/91 |

OTHER PUBLICATIONS

Chiariglione, L., "Signal Processing of HDTV", Proceedings of the Second International Workshop on Signal Processing of HDTV, L'Aquida, Italy, 29 Feb.–2 Mar. 1988, pp. 421–430.

IEEE Transaction: Aug. 1989, Fractional Frame Rate Up–Conversion Using Weighted Median Filters.

*Primary Examiner*—Safet Metjahic
*Attorney, Agent, or Firm*—Joseph S. Tripoli; Peter M. Emanuel; Richard G. Coalter

[57] ABSTRACT

For improving motion portrayal and reducing undesirable artifacts, e.g., double images and "mouse teeth" structure, each pixel of intermediate fields in a field rate up-conversion system is determined from nearby pixels in the existing fields using an adaptive linear filtering method (or apparatus) which provides: calculation of sums of differences (one or more for each pixel involved in the adaptive filter); calculation of basic coefficients (one for each pixel involved in the adaptive filter); one-dimensional median filtering of the coefficients; two-dimensional linear filtering of coefficients; normalization of coefficients; calculation of main interpolated pixel values; and correction of interpolation in the case of fast motion.

13 Claims, 3 Drawing Sheets

METHOD AND APPARATUS FOR FIELD RATE UP-CONVERSION

FIELD OF THE INVENTION

The present invention relates generally to video signal processing and particularly to methods and apparatus for increasing the field rate (hereafter "up-conversion") of video signals.

BACKGROUND OF THE INVENTION

There are a number of known field rate up-conversion algorithms. One example is described in "Fractional frame rate up-conversion using weighted median filters", P. Haavisto et al., IEEE Transactions on Consumer Electronics, Vol.35, No.3, August 1989, which uses weighted median filtering and a motion detector. The known algorithms show a poor motion portrayal and undesirable artifacts.

SUMMARY OF THE INVENTION

The present invention is directed to meeting the need for a method for field rate up-conversion with improved motion portrayal and a reduction of visible artifacts.

In principle the inventive method comprises, in field rate up-conversion, using adaptive interpolation, wherein each pixel (X) value of an interpolated field (IP) is calculated using an adaptive filter the input of which are original pixel values spatially-temporally surrounding that pixel value to be interpolated (X), and comprises the following steps:

(i) calculation (32; DA1–DAIII, 411–418, 421–426) of one or more sums of absolute pixel value differences (SA, SA', SB, SC, SD, SE) for the pixels involved (A, B, C, D, E) in said adaptive filter and associated with the pixel value (X) to be interpolated;

(ii) for each of the pixels involved in the adaptive filter a basic coefficient (VA, VB, VC, VD, VE) is calculated (33; 430–436) which depends on the sums, wherein the smaller said sum, the larger the contribution of the associated pixel is in the adaptive filter;

(iii) horizontal-vertical linear filtering (351–356; 441–445) of each of said basic coefficients to form filtered coefficients (CA, CB, CC, CD, CE);

(iv) calculation of the value of the pixel to be interpolated (X) by combining (38; 492, 494, 496, 498) the pixel values involved in the adaptive filter after having been multiplied (371–375; 491, 493, 495, 497, 499) with the respective ones of the filtered coefficients;

(v) calculation (36; 481, 482, 487, LD+1T) of correction values which are combined (485) in case of fast motion with each of the filtered coefficients or with the value for the pixel (X) to be interpolated; and (vi) normalization (39; 483, 487, 484, 486) of the value for the pixel (X) to be interpolated or of the motion corrected coefficients.

The present invention is further directed to meeting the need for apparatus utilizing the method of field rate up-conversion of the invention.

To briefly summarize the principles of apparatus embodying the invention for field rate up-conversion, the apparatus uses adaptive interpolation, wherein each pixel (X) value of an interpolated field (IP) is calculated using an adaptive filtering the input of which are original pixel values spatially-temporally surrounding that pixel value to be interpolated (X). The apparatus comprises:

(i) first calculation means (32; DA1–DAIII, 411–418, 421–426) for one or more sums of absolute pixel value differences (SA, SA', SB, SC, SD, SE) for the pixels involved (A, B, C, D, E) in the adaptive filtering and associated with the pixel value (X) to be interpolated;

(ii) second calculation means (33; 430–436) for calculating for each of the pixels involved in the adaptive filtering a basic coefficient (VA, VB, VC, VD, VE) which depends on the sums, wherein the smaller the sum the larger the contribution of the associated pixel is in the adaptive filtering;

(iii) horizontal-vertical linear filter means (351–356; 441–445) for each of the basic coefficients to form filtered coefficients (CA, CB, CC, CD, CE);

(iv) combining means (38; 492, 494, 496, 498) for calculating the value of the pixel to be interpolated (X) from the pixel values involved in the adaptive filtering after having been multiplied in multiplier means (371–375; 491, 493, 495, 497, 499) with the respective ones of the filtered coefficients;

(v) third calculation means (36; 481, 482, 487, LD+1T) for calculating correction values which are combined (485) in case of fast motion with each of the filtered coefficients or with the value for the pixel (X) to be interpolated; and (vi) normalization means (39; 483, 487, 484, 486) for adjusting the value for the pixel (X) to be interpolated or of the motion corrected coefficients.

Illustratively, the method and apparatus described above may be used to provide interpolation of an intermediate field for a 100 Hz display from two consecutive fields of a 50 Hz interlace signal but could also be used at other rates, for example, to provide a 60 to 120 Hz conversion. To simplify the following explanation and discussion of the illustrative embodiments of the invention, the following description does not describe details of methods of speeding up the existing and interpolated fields to provide a 100 Hz or 120 Hz output, which is a simple and well known operation.

BRIEF DESCRIPTION OF THE DRAWING

The foregoing and further features of the invention are illustrated in the accompanying drawing wherein.

DETAILED DESCRIPTION

Figure 1A:
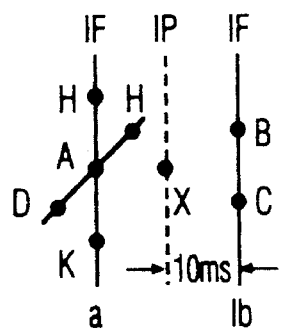
FIG. 1A is a diagram illustrating spatial-temporal positions of samples.

In an exemplary field rate up-conversion application, the invention may be used for interpolating fields to provide an AABB scanning pattern as shown in the following table wherein "A" and "B" are field types, "*" represents an input sample and "X" represents an interpolated sample and the temporal (field to field) direction is horizontal for a eight field sequence:

TABLE (1)

| Field type | A | A | B | B | A | A | B | B |
|---|---|---|---|---|---|---|---|---|
| | * | X | | | * | X | | |
| | | | * | X | | | * | X |
| | * | X | | | * | X | | |
| | | | * | X | | | * | X |
| Field No. | 1 | 2 | 3 | 4 | 1 | 2 | 3 | 4 |
| | | |← 40 mS →| | | | | |

Illustratively, the method of the present invention may also be used in conjunction with any interlace-to-progressive scan conversion (proscan) algorithm to produce fields for an "ABAB" scanning pattern as indicated below in table (2) wherein "A" and "B" are field types, "+" is progressive scan interpolated, "*" is an input sample, "X" is an interpolated sample, "O" is an input sample not appearing in the output and the temporal dimension is illustrated horizontally.

TABLE (2)

| Field type | A | B | A | B | A | B | A | B |
|---|---|---|---|---|---|---|---|---|
| | * | + | | | * | | *+ | |
| | | X | O | X | | X | O | X |
| | * | + | | | * | | *+ | |
| | | X | O | X | | X | O | X |
| Field No. | 1 | 2 | 3 | 4 | 1 | 2 | 3 | 4 |
| | | |← 40 mS →| | | | | |

Here, the second field (2) in the sequence is calculated using the 100 Hz up-conversion method with the two input fields interchanged, the third field (3) using the proscan algorithm and the fourth field (4) using the 100 Hz algorithm as described. An advantage of this approach using "ABAB" scanning is that line flicker is eliminated. It will be noted there is some additional complexity owing to the need for forward and time-reversed operation of the 100 Hz method and the addition of the proscan algorithm.

The description below relates to the luminance component of the signal. For the color difference components, a similar or simpler signal processing method could be used.

Briefly stated, the method of the invention calculates each pixel X of the intermediate fields from nearby pixels in the existing fields using an adaptive linear filter characterized by the following steps:

Calculation of sums of differences, (one or more for each pixel involved in the adaptive filter);

Calculation of basic coefficients, (one for each pixel involved in the adaptive filter);

One-Dimensional median filtering of coefficients;

Two-dimensional linear filtering of coefficients;

Normalization of coefficients;;

Calculation of main interpolated pixel value; and

Correction of interpolation in the case of fast motion.

Each of these steps is described in detail below. For most of the steps several variations are possible. Two of these variations will be referred to as the "reference algorithm" and the "simplified algorithm". The reference algorithm gives good performance on a wide variety of picture material. The simplified algorithm also appears to give good performance and is simpler to implement in hardware.

In the reference algorithm, the pixels involved in the main interpolation are the set (A B C D E) shown in FIG. 1A. Also additional samples could be used. Other versions of the invention use only the set (A B C) or the set (A D E H K).

Figure 1B:
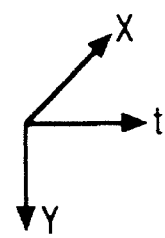
FIG. 1B is a spatio-temporal coordinate system diagram for the diagram of FIG. 1A.

FIG. 1A is a three dimensional diagram having the x (horizontal), y (vertical) and t (temporal) coordinates as indicated in the associated x, y, t coordinate diagram of FIG. 1B. The samples A- C, H, K and X are located in the vertical-temporal (y, t) plane of the associated x, y, t coordinate diagram. Samples A, D, E and X are located in the horizontal-temporal (x, t) plane. Interpolated fields IP are located between input fields IF.

Other pixels used in the algorithm (i.e., the "method") will be referred to by a system of coordinates (y, x) based on pixels and picture-lines-lines, referred to an origin at the interpolated pixel X. Pixels in the preceding input field are called "a (y, x)" and pixels in the next input field are denoted by "b (y, x)". The pixels of FIG. 1 mentioned above therefore have the following coordinates:

TABLE 3

| A = a (0,0) | D = a (0,−1) |
|---|---|
| B = b (−1,0) | E = a (0,1) |
| C = b (1,0) | |

In the remainder of this description, sub-headings are inserted to delineate the different steps of the method of the invention for implementing the adaptive linear filter characteristic.

Calculation of Sums of Differences

With each pixel (e.g., A, B, . . . ) involved in the main interpolation, is associated a sum (e.g., SA, SB, . . . ) of e.g. three (absolute) differences which will be used to determine how important a contribution the pixel will make to the interpolation. The smaller the sum of differences, the larger the contribution of the associated pixel will be. At first, one or two principal differences are assigned to each pixel used in the adaptive filter, each involving two pixels of which one is the input pixel and the other a pixel as nearly as possible opposite (minimum deviation angle) the input pixel with respect to the interpolated pixel X. For example, the principal difference corresponding to input pixel C, or b (1,0), is |b(1,0) - a(−2,0)| and the two principal differences corresponding to input pixel E, or a(0,1), are |a(0, 1) - b(−1,−1)| and |a(0,1) - b(1,−1)|.

Input pixels in the line containing D, A and E have two principal differences (because of the symmetry of this line with respect to X); all others have one.

The principal difference is already a measure of the importance of its associated pixel, but to make a more reliable measure a sum of absolute values of the principal difference and two parallel differences is taken. For pixels B and C which represent vertical displacements relative to X, the parallel differences are those to the left and right of the principal difference, while for D and E which represent horizontal displacements, the parallel differences are those above and below the principal difference. For pixels having two principal differences, the minimum of the two corresponding sums of differences is taken.

For example, the sum of differences SC associated with input pixel C is:

| SC = |b (1,0) − a (−2,0)| | +|b (1,−1) − a (−2,1)| |
|---|---|
| | +|b (1,1) − a (−2,−1)| | and the sum of differences SE associated with input pixel E is:

$$SE = \min \{|a(0,1) - b(-1,-1)| + |a(-2,1) - b(-3,-1)|$$
$$+ |a(2,1) - b(1,-1)|,$$
$$|a(0,1) - b(1,-1)| + |a(-2,1) - b(-1,-1)|$$
$$+ |a(2,1) - b(3,-1)|.$$

The pixel A is a special case. Its three differences can be adjacent either horizontally (as in the reference algorithm) or vertically and its sum of differences can be expressed either as a minimum, as for D and E, or (in the reference algorithm) the two sums kept separate as SA and SA' and carried over to the next stage of the algorithm.

Figure 2A:
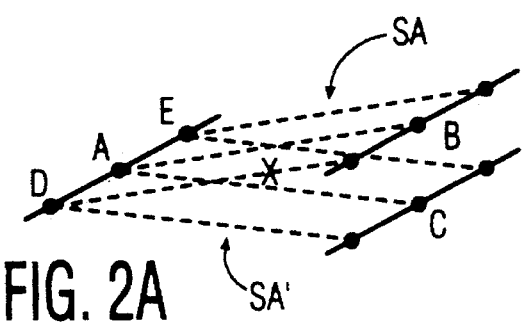
FIGS. 2A, 2B, 2C and 2D are diagrams illustrating sample positions related to sums of differences.
Figure 2E:
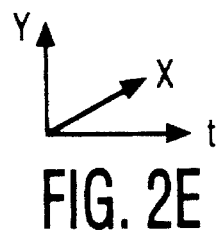
FIG. 2E is a spatio-temporal coordinate system diagram for the diagrams of FIGS. 2A–2E.
Figure 2B:
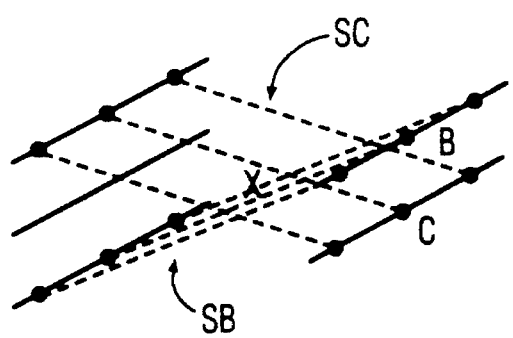
Figure 2C:
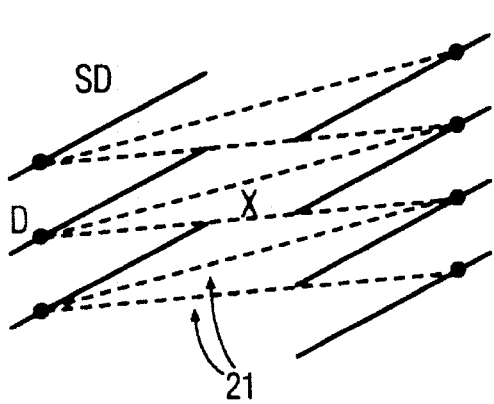
Figure 2D:
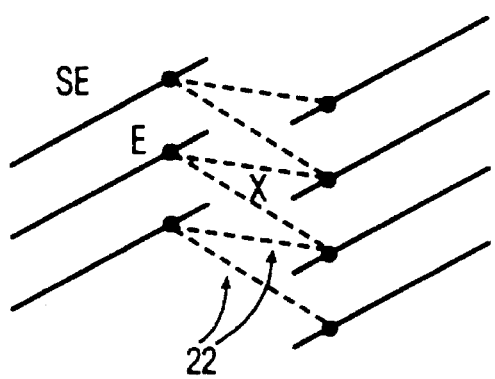

FIG. 2A depicts the samples involved for the calculation of SA and SA'. Correspondingly, FIG. 2B relates to SB and SC, FIG. 2C to SD and FIG. 2D to SE. For SD and SE, respectively, the minimum of two sums 21 and 22, respectively is elected. In the simplified algorithm, the principal differences do not contribute to the sums of differences; only the two adjacent differences are used.

Calculation of Basic Coefficients

The next step is to calculate for each input pixel A, B, . . . a basic coefficient VA, VB, . . . which depends on the associated sum of differences using one of two methods which take into account the global distribution of the sums of differences. The method of the reference algorithm is to sort the sums of differences in ascending order as S1 to S6 and then associate values of 6, 3, 2, 1 or 0 with each sum, depending on a measure of overall activity based on the sums of differences, for example according to the following list:

TABLE 3

| | |
|---|---|
| If no sums < threshold, | V1=V2=V3=V4=V5=V6=0 |
| If no sums < threshold, | V1=6, V2=V3=V4=V5=V6=0 |
| If no sums < threshold, | V1=V2=3, V3=V4=V5=V6=0 |
| Otherwise, | V1=3, V2=2, V3=1, V4=V5=V6=0 |

Here, V1 is the value associated with the smallest sum, V2 with the next smallest and so on. The above step is designed to give large values to small differences and to involve more pixels when there are several small differences than when the overall activity is high. Illustratively, in the reference algorithm, the threshold is equal to 64 (with respect to 8-bit quantization).

In a second version, associated with the three lowest sums S1, S2, S3 are values V1, V2, V3 which depend on the number of sums amounting to less than the threshold. Correspondingly, V4, V5, and V6 are canceled in the table above.

Each basic coefficient is then set to one of the values Vn depending on where its associated sum of differences falls in the ordered list. In the above example, if SE is the second lowest sum of differences and there are four sums less than the threshold, its basic coefficient VE will be set to V2=2. The basic coefficient VA may be the sum of two values. For example, if SA is the lowest and SA' the fifth lowest and two sums are below the threshold, the basic coefficient VA will be set to V1+V5=3+0=3.

A further method of calculating the basic coefficients, designed to be simpler to implement in hardware, is to compare the sums of differences with an increasing threshold, assigning a basic coefficient when its sum of differences is less than the threshold and stopping the process when the sum of basic coefficients reaches a predetermined value. In one version, the threshold takes values of 8, 16, 32 and 64 successively, sums of differences less than 8 are given basic coefficients of 4, sums between 8 and 16 are given basic coefficients of 3, sums between 16 and 32 are given 2 and sums between 32 and 64 are given 1, the process of assigning coefficients stopping when the sum reaches or exceeds 10. For example, the values of sums of differences and of associated basic coefficients may be as follows:

| | |
|---|---|
| SA=24, VA=2+1=3 | SC=55, VC=1 |
| SA'=34 | SD=42, VD=0 |
| SB=7, VB=4 | SE=19, VE=2 |

Here, the process stops before VD is given a value even though it is in the range leading to a value of 1, because the sum of coefficients reached ten when VC was set to 1. In the simplified algorithm, the value assigned to each basic coefficient is always 1 (or 2 for VA) but the process of successively raising the threshold is still carried out as described above, this time stopping when the sum reaches 2, for example.

One-Dimensional Median Filtering of Coefficients

This is an optimal step, carried out on each basic coefficient to reduce the effects of noise and of 'wrong decisions' in previous steps resulting from particularly difficult structures in the picture. In the reference algorithm, the median filter uses three samples in a line but spread over a five-sample window (1 0 1 0 1). This is preferred to a simple window of three adjacent samples because of the horizontal smoothing already carried out by taking sums of adjacent differences. Median filtering can be omitted in the simplified algorithm.

Two-Dimensional Linear Filtering of Coefficients

The next step is to pass each basic coefficient, after median filtering if used, through a two-dimensional linear filter, for example with the following window which is used in the reference algorithm (values expressed in multiples of $\frac{1}{64}$):

| | | | | |
|---|---|---|---|---|
| | 4 | 6 | 4 | |
| 4 | 8 | 12 | 8 | 4 |
| | 4 | 6 | 4 | |

Such a filter requires two line delays for each coefficient but it should be noted that the ranges and combinations of possible basic coefficient values are limited as a result of the steps described above. These limitations can be exploited in order to minimize the memory requirements. In the simplified algorithm, an example of a suitable window is a s follows, in multiples of $\frac{1}{16}$:

| | | |
|---|---|---|
| | 2 | |
| 3 | 6 | 3 |
| | 2 | |

AT the output of this step, the five coefficients are called CA, CB, CC, CD and CE.

Correction for Fast Motion

At this stage, a correction is made for fast motion which in some versions of the algorithm involves the introduction of further pixels into the interpolation. Fast motion is detected by calculating for each pixel the sum S of the five coefficients and applying a simple linear law to produce a fast motion indicator CF, for example CF=max{½*$S_{max}$- S, 0} where $S_{max}$ is a nominal maximum value of the sum of coefficients (In fact, $S_{max}$ is the maximum value of the sum of coefficients at the input to the two-dimensional linear filter multiplied by the d.c. gain of that filter).

In the reference algorithm, ⅕ of the value of the fast motion indicator is added to each of the five coefficients to produce a blurring effect in fast-moving areas, an effect preferable to the double image that might otherwise be obtained. Especially, a value of (48*6-S)/5, if positive, can be added to each filtered coefficient.

In other versions of the algorithm, the fast motion indicator gives the values of further coefficients which are used to provide additional blurring. For example, in the simplified algorithm a coefficient of CF/4 is assigned to each of a (-2, -1), a(2, 1), b(-1, 1) and b(1, -1). In another version, the coefficient CF is assigned to an average over a 5 times 3 window. It is also possible to derive the fast motion indicator from coefficients that have passed through a filter other than the two-dimensional window given above. In particular, good results have been obtained with a cross-shaped window of five pixels, i.e. having no diagonal elements, while still using the larger window for the filtering of coefficients in the main path. This modification has the advantage that the fast motion indicator is less likely to 'leak' into areas that are near to but not part of fast moving objects.

Normalization of Coefficients

The last step in the calculation of coefficients is to scale the set of filtered coefficients for each pixel in turn by a constant so that their sum is equal to "1". In practice, the normalization can also be carried out as a final step in the process by dividing the interpolated pixel value by the sum of the coefficients.

Calculation of Main Interpolated Pixel Value

This step may be implemented once the coefficients have been calculated and normalized. The value of the interpolated pixel X is the sum of products of the coefficients and the corresponding input pixel values.

Figure 3:
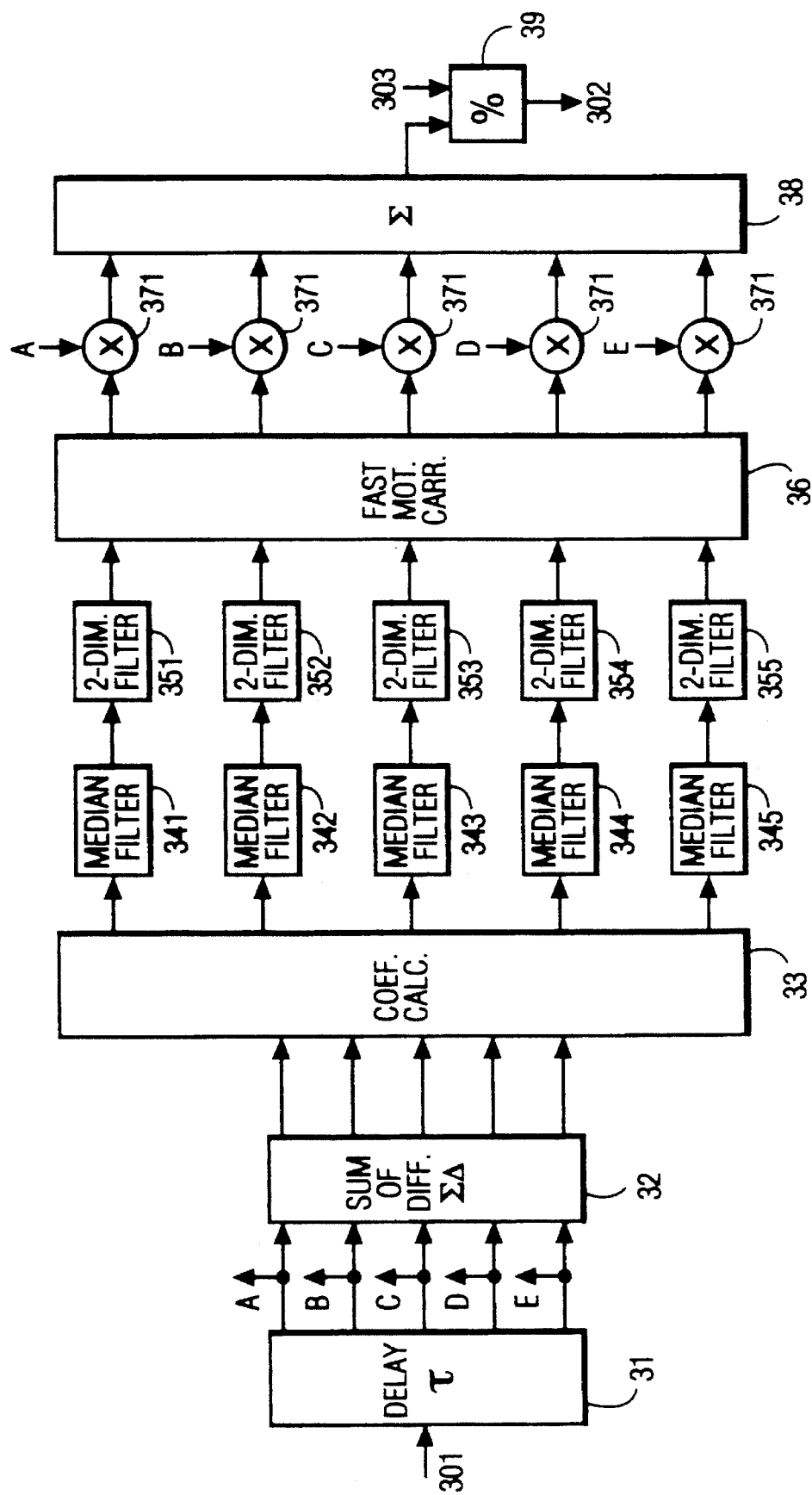
FIG. 3 is a simplified block diagram of an apparatus according to the "reference" method of the invention.
Figure 4:
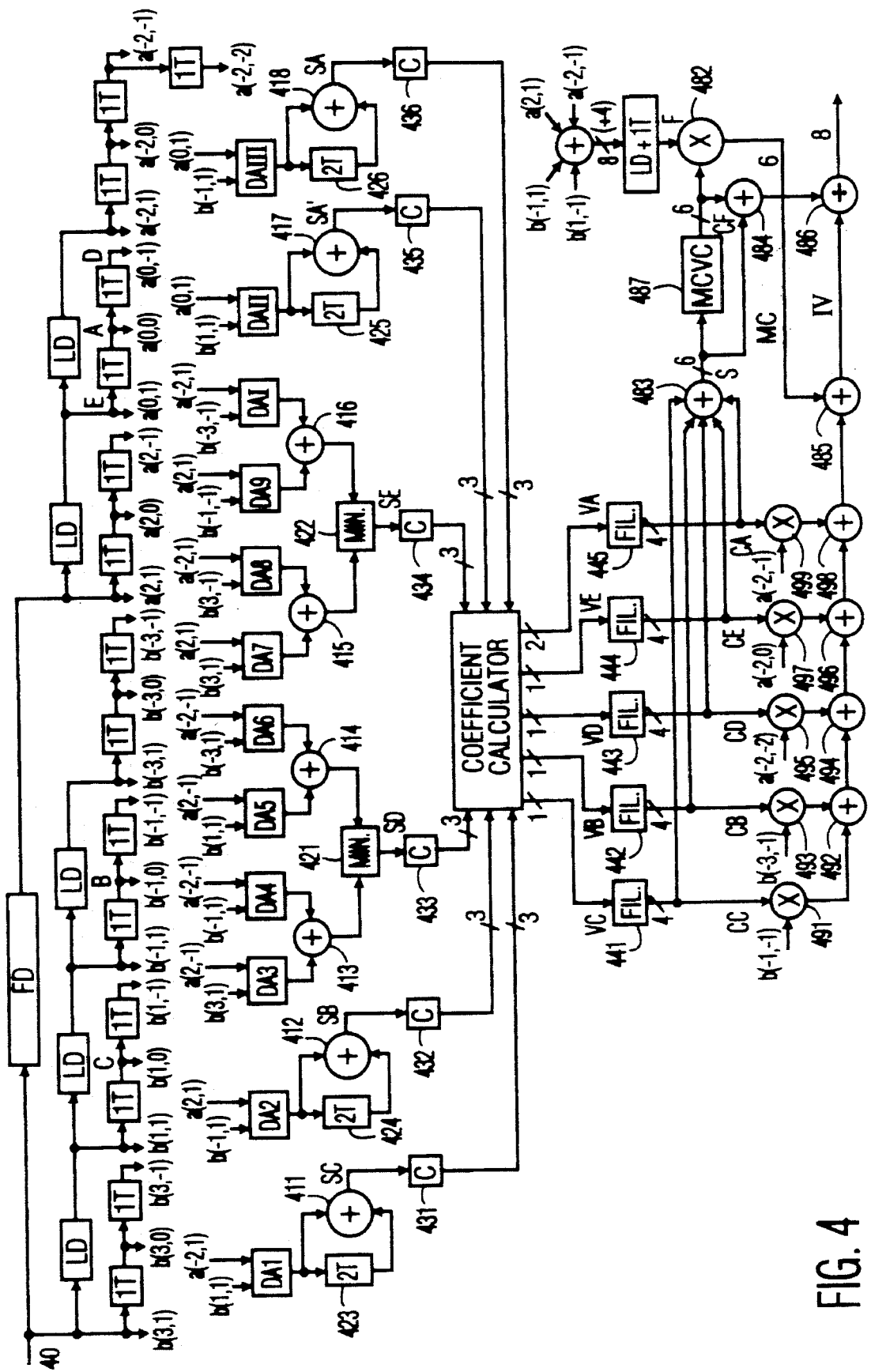
FIG. 4 is a detailed block diagram for an apparatus according to the "simplified" method of the invention.

Considering now the details of the exemplary embodiments of the invention, in FIG. 3 the input signal, e.g. a TV signal of 625 or 1250 lines, 50 Hz, 2:1 is fed to delay unit 31 which outputs the samples A to E involved in the following calculations. The delay device may use field delays FD, line delays LD, and one-sample-delays 1T as depicted in FIG. 4. The circuitry of the delay units can easily be adapted to any required sample locations. These samples are fed to multipliers 371-375 and are used in a sums-of-differences circuit 32 to calculate the sums SA, SA', SB, SC, SD, and SE. These sums pass a coefficient calculator (Coef. Calc.) 33 which outputs respective basic coefficients VA, VB, VC, VE and VD.

Each of these coefficients passes a respective branch, each branch including a median filter 341-345 and a subsequent two-dimensional filter 351-356. The output signal of each branch passes a fast-motion correction stage 36 which adds a respective correction value to each filtered coefficient, thereby producing a blurring effect.

In subsequent multipliers 371-375 the sample values A-E are weighted by the corrected coefficients and combined in adder 38. The output signal of this adder becomes normalized in a subsequent divider 39 using at input 303 the sum of the corrected coefficients (to simplify the drawing, the respective adders are not depicted). The final sample value X is available at the output 302 of divider 39.

The order of some processing steps can be modified, e.g. the normalization can be executed in combination with the weighting step. Also, one or more of the processing steps can be executed in combination with the weighting step. Also, one or more of the processing steps (e.g. fast-motion correction, median filtering, two-dimensional filtering) may be omitted.

Simplified Method and Apparatus

The following description provides further details of the foregoing description of the simplified method and apparatus or "algorithm" of the invention. The description refers to the detailed block diagram of the field rate up-conversion apparatus shown in FIG. 4. Compensating delays are not shown in the block diagram except where the delays being compensated are fundamental to the algorithm. In order to provide the sample values needed for calculating the sums of differences, a set of field (FD), line (LD) and sample (1T) delays are provided as shown.

These sample values are fed to twelve difference circuits DA1-DAIII. These circuits contain a subtractor followed by an absolute value calculator. The sums of differences are then formed, either by using a two sample-delay (2T) 423, 424, 425, 426, each delaying the second input of a subsequent adder 411, 412, 417, 418, or by combining the outputs of each two circuits DA3+DA4, DA5+DA6, DA7+DA8 and DA9+DAI in an adder 413, 414; 415 and 416, respectively, the outputs of each two of which (413+414, 415+416) are fed to a minimum value circuit 421, 422. Adders 411, 422, minimum values circuits 421, 422, and adders 417, 418 output the sums SC, SB, SD, SE, SA' and SA, respectively. Note that here only two differences are involved in each sum, those on either side of the principal difference. In the case of sums SA, SA', SB and SC the sums are shown here carried out on a rolling basis across the two-sample delays 2T.

The calculation of basic coefficients is carried out in subsequent comparators 431-436, respectively, and in a coefficient calculator 430. For each sum, the comparators compare the value of the sum with four thresholds '8', '16', '32' and '64', producing one of five answers which is shown emerging from each comparator as a 3-bit number. The comparators are thus, in effect, non-linear quantizers. Coefficient calculator 430 takes all six quantized values and calculates five respective coefficients VC, VB, VD, VE and VA. Initially it calculates six one-bit values of which the two corresponding to the smallest (quantized) input values are '1' and the other four are '0'. The coefficient VA is then the sum of the two one-bit values corresponding to SA and SA' and the other coefficients are simply the one-bit values themselves. Note that if only one of the sums is less than '64', the highest threshold, then only one coefficient is set to '1' and if all sums exceed '64' then all coefficients are set to '0'.

For each basic coefficient, filter circuits 441-445, respectively, perform the 5-tap spatial filtering operation according to the window given above. Note that each filter requires two line delays but only of one-bit or two bit values.

For fast motion correction, the sum S of the filtered coefficient values from the outputs of filters 441-445 is formed in an adder 483 and passed through motion coefficient value circuit 487 which calculates the fast motion coefficient CF=max{1-S, 0}. This coefficient acts in a multiplier 482 on the blurred signal F emerging from a one-line-and-one-sample delay LD+1T which follows the averaging of the four pixel values b(1,−1), b(−1,1), a(2,1) and a(−2,−1) in a combiner 481. This delay is necessary to compensate for the theoretical delay in the coefficient filters 441–445. It could equally have been implemented by taking the four pixel values to combiner 481 from appropriate points in the set of delays mentioned above, but in any case this would necessitate an additional line delay at the end of the chain.

The five filtered coefficients CC, CB, CD, CE and CA at the output of filters 441–445 are then multiplied in respective multipliers 491–499 by five pixel values b(−1,−1), b(−3,−1), a (−2,−2), a(−2,0), a(−2,−1) corresponding to samples A, B, C, D and E but delayed by one line and one pixel to compensate for the theoretical delay in the coefficient filters 441–445. The resulting partial sums are added together in adders 492–498 and in adder 485 to the partial sum MC (resulting from fast motion correction) at the output of multiplier 482, to form the interpolated value IV prior to normalization. Finally, the interpolated value is divided in a divider 486 by the sum of all the coefficients CA+CB+CC+CD+CE+CF which has been calculated in an adder 484 from the output of adder 483 and circuit 487. This operation has the same function as normalizing the coefficients.

Advantageously, artifacts like double image and 'mouse teeth' structures can be avoided by the invention.

The invention may be used in TV receivers or VCR'S or any other display units. The numbers given can easily be adapted to different TV standards or input signal characteristics. Also, 50 to 75 Hz up-conversion can be carried out, if respective modifications are made.

We claim:

1. A method for field rate upconversion using adaptive interpolation, wherein each pixel value (X) of an interpolated field (IP) is calculated using an adaptive filter the input of which are original pixel values spatially-temporally surrounding a pixel value (X) to be interpolated, said method comprising the steps of:

calculating one or more sums of absolute pixel value differences from said original pixel values spatially-temporally surrounding said pixel value (X) to be interpolated;

calculating, for each of said original pixel values a basic coefficient which depends on said sums, wherein the smaller said sum, the larger the contribution of the associated original pixel value is in said adaptive filter;

applying horizontal-vertical linear filtering to each of said basic coefficients to form filtered coefficients;

calculating the value of the pixel to be interpolated (X) by combining pixel values involved in said adaptive filter after having been multiplied with respective ones of said filtered coefficients;

calculating motion correction values (MC) which are combined in case of fast motion with each of said filtered coefficients or with the value for said pixel (X) to be interpolated; and normalizing the value for said pixel (X) to be interpolated or of said filtered coefficients.

2. A method according to claim 1 wherein said basic coefficients are median filtered horizontally prior to said horizontal-vertical linear filtering.

3. A method according to claim 2 wherein, the step of median filtering said basic coefficients is carried out over a five-sample window.

4. A method according to claim 1 wherein said adaptive filter is applied to a luminance component only.

5. A method according to claim 1 wherein for said sums:

principal differences between pixels involved in said adaptive filter are used which are calculated between each of two of these pixels, of which one is the input pixel and the other a pixel as nearly as possible opposite (minimum deviation angle) the input pixel with respect to the pixel to be interpolated (X);

two differences parallel to each principal difference are used;

for pixels which represent vertical displacements relative to X, the parallel differences are those to the left and right of the principal difference;

for pixels which represent horizontal displacements, the parallel differences are those above and below the principal difference; and for pixels having two principal differences, the minimum of the two corresponding sums of differences is taken.

6. A method according to claim 5 wherein said basic coefficients are median filtered horizontally prior to said horizontal-vertical linear filtering.

7. A method according to claim, 1 wherein:

for those pixels (A) involved in said adaptive filter which are temporally adjacent and of identical spatial location with respect to the pixel to be interpolated (X), two of said sums of absolute pixel differences are calculated (SA, SA') from horizontally and vertically adjacent pixels, and a selected one of (i) both said sums or (ii) the minimum of said sums is used for calculating said basic coefficients.

8. A method according to claim 1, wherein for said normalization of said value for said pixel (X) to be interpolated, for each pixel a sum S of said filtered coefficients is produced and added to a fast motion indicator signal CF to produce a normalization control signal.

9. A method as recited in claim 8 wherein said fast motion indicator signal CF is selected to equal the function max{½*$S_{max}$- S,0} where $S_{max}$ is a nominal maximum value of the sum of the coefficients.

10. A method as recited in claim 1 wherein for calculating said correction values (MC) a cross-shaped window of five pixels is used.

11. Apparatus for field rate upconversion using adaptive interpolation, wherein each pixel (X) value of an interpolated field (IP) is calculated using an adaptive filtering the input of which are original pixel values spatially-temporally surrounding a pixel value to be interpolated (X), said apparatus comprising:

first calculation means for providing one or more sums of absolute pixel value differences from said original pixel values spatially-temporally surrounding said pixel value (X) to be interpolated;

second calculation means for calculating for each of said original pixel values a basic coefficient which depends on said sums, wherein the smaller said sum, the larger the contribution of the associated Original pixel value is in said adaptive filtering;

horizontal-vertical linear filter means for filtering each of said basic coefficients to form filtered coefficients;

combining means for calculating the value of the pixel to be interpolated (X) from the pixel values involved in said adaptive filtering after having been multiplied in multiplier means with respective ones of said filtered coefficients;

third calculation means for adjusting the value for said pixel (X) to be interpolated or of said filtered coefficients; and normalization means for adjusting the value for said pixel (X) to be interpolated or of said filtered coefficients.

12. Apparatus according to claim 11 wherein median filtering means are inserted between said second calculation means and said horizontal-vertical linear filtering means for filtering said basic coefficients horizontally.

13. Apparatus according to claim 12 wherein said median filtering means includes a five-sample window.

* * * * *